July 10, 1956     I. V. ZOZULIN ET AL     2,754,438
CLUTCHES OF THE PERMANENT MAGNETIC TYPE
Filed Dec. 15, 1952
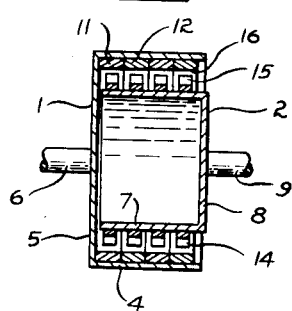
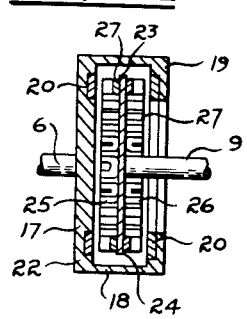
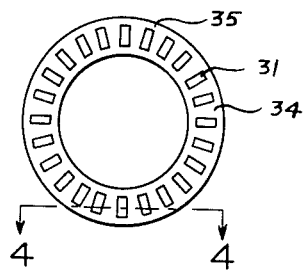
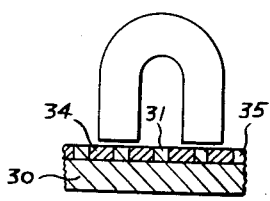
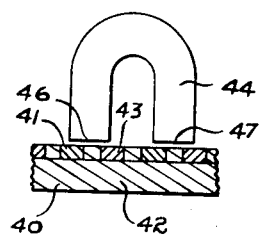
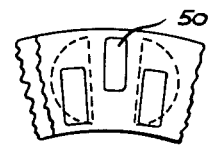
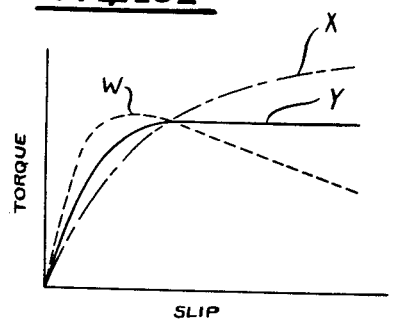
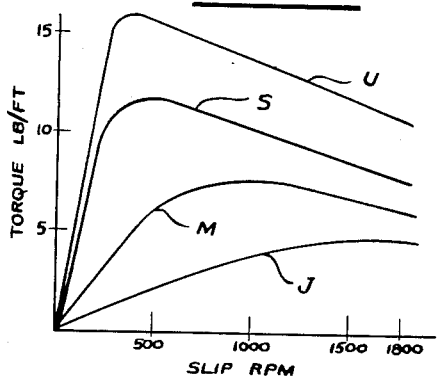
INVENTORS
IGOR V. ZOZULIN
GEORGE J. OKULITCH
GEORGE M. VOLKOFF
VLADIMIR J. OKULITCH
ALEC S.J. ELLETT
ATTORNEY United States Patent Office 2,754,438
Patented July 10, 1956

2,754,438
CLUTCHES OF THE PERMANENT MAGNETIC TYPE

Igor V. Zozulin, George J. Okulitch, George M. Volkoff, Vladimir J. Okulitch, and Alec S. J. Ellett, Vancouver, British Columbia, Canada, assignors to Magnetorque Couplings Limited, Vancouver, British Columbia, Canada Application December 15, 1952, Serial No. 325,972

4 Claims. (Cl. 310—105)

Our invention relates to improvements in clutches of the permanent magnetic type.

In permanent magnetic clutches as heretofore devised it was impossible to make full use of the force of the permanent magnets, consequently the magnetic mass required to transmit heavy loads was unduly great or it became necessary to make the drive and driven elements of excessively large diameter. It was also impossible to design a clutch which would transmit a given maximum torque at a predetermined given slip and to design the clutch so that a desired decrease in torque should take place with a given slip, or to arrange for a substantially regular increase of torque proportionate to the increase of slip between the drive and driven elements. These defects can be overcome by the present invention without resorting to mechanical change in the relative disposition of the drive or driven elements, or the increase or decrease of the air gap between said elements. A further object of the invention is to provide a clutch in which the pull is continuous as between the drive and driven elements due to the fact that only attractive force is made use of and repulsion is avoided, consequently the drive and driven elements are free to come to rest in any relative circumferential position and the common failing of conventional clutches of this type, of the driven element coming to rest at any one of the points where one magnet is directly opposite to another of opposite polarity, is avoided. A still further object is to provide a structure wherein as heat increases in one element due to resistance to rotation of the other the torque will also increase as against the common tendency of torque to decrease as heat in one or both elements increase.

Referring to the accompanying drawings:

Figure 1 is a sectional schematic view showing the arrangement of a drive and driven elements in a clutch having two different torque characteristics.

Figure 2 is a similar view of a modification of the arrangement shown in Figure 1.

Figure 3 is a plan view showing a laminated drive element which may be used in the clutch.

Figure 4 is a sectional view taken on the line 4—4 of Figure 3.

Figure 5 is a graph showing torque transmitted and slip developed in a clutch according to the type of drive element used.

Figure 6 is a sectional view of drive and driven elements designed to give a synchronous clutch.

Figure 7 is a fragmentary plan view of the elements of an non-synchronous clutch.

Figure 8 is a graph showing slip developed in a clutch designed to give constant torque.

In the drawings like characters of reference indicate corresponding parts in each figure.

The clutch, as shown in Figure 1, consists of a drive element or rotor 1 and a driven element or rotor 2. The drive element is a cylinder 4 having an end closure 5 which is carried by a central shaft 6. The driven element is a smaller cylinder 7 extending inwardly into the cylinder 4 and having an end closure 8 which has a central shaft 9 aligned with the shaft 6.

The cylinder 4 is fitted internally with a plurality of circular bands of metal or armatures which are indicated by the numerals 11 and 12 and adjoin each other or are closely spaced apart and are of different material, as will be hereinafter shown. The cylinder 7 is fitted with a plurality of rows 14 of permanent magnets 15, which are spaced from the bands to provide an air gap 16 of appropriate dimension, preferably around .050″. The magnets 15 have their pole pieces arranged in tandem about the cylinder 7 to which they are attached. It will be obvious that if the metal of the clutch cylinder 4 is of iron or other magnetic material and the metals of the bands 11 and 12 are, for instance, copper and aluminum, the rotation of the drive element will cause the driven element to rotate also.

In the modification shown in Figure 2, the shaft 6 is fitted to the end closure 17 of a cylinder 18 and the outer end of the cylinder is provided with an inturned flange 19. The closure and the flange are recessed to receive annular bands or armatures 20 of two or more metals to be hereinafter described, which bands and other enumerated parts constitute a drive element or rotor 22. Concentrically mounted within the drive element 22 is a driven element or rotor 23 which consists of a disk 24 having on its faces annular rows 25 and 26 of magnets 27, likewise having their pole pieces arranged in tandem as described with respect to Figure 1.

While the elements 1 and 22 are described as drive elements and the elements 2 and 23 are described as driven elements, it will be obvious that either drive element may be used as a driven element and its complementary element may be used as a drive element.

In prior applications for patents we have shown structures involving the use of a drive element of magnetic substance or magnetic metal coated on opposite sides with a non-magnetic substance interposed between two circular rows of magnets carried by opposing members of a driven element which was capable of developing a given torque which varied according to the slip between the elements. In the present invention we modify the above structure by using a single circular row of magnets spaced from a single band of magnetic material, or a bimetallic band of material where one of the metals is magnetic and the other non-magnetic and the pole pieces of each of the magnets facing the bands are arranged in tandem to increase the torque developed by the rotation of the magnets in a fixed air gap relationship to the band.

Certain metals have individuals permeability and resistivity characteristics and by using one or more metals of a different kind, viz: magnetic or non-magnetic, as a tractive element in a permanent magnet clutch and by making a clutch of two or more units, say one with a tractive element of magnetic metal and the other with a tractive element of magnetic and non-magnetic metals we can produce a clutch of many different torque characteristics.

We have discovered that the disposition of the magnets with relation to the armature bands of material opposing their pole pieces and the composition and arrangement of the metal of said band is of extreme importance and that the torque developed per pound of magnet mass can be greatly increased over the present known arrangement.

In developing the clutch we have discovered that by using an annular row of magnets as a driven element and an armature disk or band of magnetic material such as soft iron as a drive element we obtain a maximum torque of five pounds per foot for a given weight of magnet, see curve J of Figure 5.

When, as an example, we use an armature band of copper only and of a thickness of substantially seven sixty-fourths of an inch we obtain a torque of seven pounds, see curve M of Figure 5.

As a further example we find that with the same weight of magnet and a given air gap between magnets and armature band we obtain by making the drive element bimetallic with a magnetic metal base lamination of a thickness of say three sixteenths of an inch and having a lamination of copper of seven sixty-fourths of an inch facing the magnet poles, that the torque is increased to eleven pounds, see curve S of Figure 5.

In a further development the armature band used consists of a lamination 30 of iron having spaced transverse ribs 31, and the ribs are spaced apart with, for example, four ribs to the overall width across both poles of a magnet and two ribs to the interspace between two adjacent magnets. The lamination 30 is faced with a transversely slotted lamination 34 of copper, the slots of which are filled with the ribs 31, as shown in Figures 3 and 4. The torque developed by this band, which is generally indicated by the numeral 35 is 16 pounds per foot, see curve U of Figure 5.

It will be noticed that the maximum foot pound torque of different band structures as shown in Figure 5 is reached at different degrees of slip between the drive and driven elements and that clutches made with one band of copper and a magnetic substance and another band of ribbed magnetic substance with a non-magnetic substance between the ribs, each will reach its maximum torque with a slip of less than five hundred R. P. M.

In the case of a ribbed magnetic material with a non-magnetic overlay and the simple bimetallic lamination of magnetic substance and a non-magnetic lamination, the torque drops somewhat sharply as slip increases.

The results above described are obtained with the magnets placed about the periphery of the driven element with their several pole pieces in alignment with each other and with an air gap between the poles and the band of one thirty-second of an inch which we find to be generally more efficient than other spacings. For example, we obtain good results where a non-magnetic lamination is used in face to face contact with a magnetic material lamination and the total thickness of the non-magnetic lamination is not less than one thirty-second of an inch or more than one eighth of an inch in thickness.

It will be apparent that clutches built up to the different armature bands herein described can be made to fit a variety of loads and it is also apparent that some loads will call for a clutch having certain specific characteristics. As for instance, a clutch may be required wherein maximum torque is required at around five hundred R. P. M. and to maintain that torque with but little slip up to say fifteen hundred R. P. M. To provide a clutch for such a rating the clutch could be designed as in either Figure 1 or Figure 2, wherein one row of magnets would coact with a bimetallic band of magnetic material and non-magnetic material and another set of magnets would coact with a band of magnetic material, or alternately the second named set of magnets would coact with a bimetallic band having one lamination of magnetic material and one lamination of a different non-magnetic material to that used with the first named row of magnets.

If it is desired to design a clutch having no slip at a predetermined loading during normal running speed, it can be done by using a bimetallic band 40 in the drive element consisting of a non-magnetic slotted lamination 41 and a magnetic lamination 42 with inserts 43 of magnetic material in the slots of the first lamination, as shown in Figure 6. The magnets 44 of the driven member would be spaced with their pole pieces 46 and 47 arranged to register with any adjacent pair of inserts 43.

When at rest, in the structure above described, each magnet would be mated with a pair of inserts and when the drive element is set in rapid motion the magnets would break with their inserts, but the eddy currents set up in the non-magnetic lamination around each insert would develop drag to start the driven element rotating. Such rotation would continue until each pair of pole pieces come into and remain in register with an insert and the drive and driven elements would turn in unison until the device is again allowed to come to rest. This structure would therefore provide a synchronous clutch and would be subject to a slightly irregularity or jerkiness in starting as the poles of the magnets would be intermittently out of step with the inserts of the band.

To provide a clutch where the drag of the non-metallic lamination is increased and that of the inserts is somewhat reduced, the inserts 50 as in Figure 7 may be staggered transversely of the armature band, so that when the pole pieces of a magnet are in direct opposition to a pair of inserts one end of one insert only is covered by one pole piece and the opposite end of the corresponding insert is covered by the other pole piece of the magnet. By this arrangement there is no flutter in the torque between the drive and driven elements and the drag of magnet to insert is reduced as the drag from magnet to non-magnetic material is increased, consequently some slip will occur at any speed.

It will be noted that in the setting as shown in Figures 3 and 4, the inserts are spaced to correspond with the centre to centre dimension of the pole pieces of a magnet and the centre of said magnet, so that at least three inserts oppose each magnet at all times, so that the magnetic flux is always flowing through the magnetic material lamination from on at least one insert to an alternately spaced lamination, thereby definitely preventing any repulsion being set up between the magnets and the inserts.

The graph shown in Figure 8 shows a clutch can be designed to provide a substantially rapid torque increase and to provide that the torque shall subsequently remain substantially constant through a long range of slip. The clutch would be provided with two annular bands and two rows of magnets opposing said bands as in Figures 1 and 2, one of the armature bands would have a torque curve as shown by dotted line W in Figure 8 and the second band would have a torque curve as shown by chain dotted line X and since these two bands are mounted to operate as a unit, the combined torque will result in a curve shown by the solid line Y in Figure 8 between the torque curves of the individual bands used in the clutch structure.

While there is a definite relationship as to spacing of the pole pieces of the magnets and the inserts in the non-magnetic lamination of the bands as shown in Figures 4, 6 and 7, the inserts may be spaced to regular distances where no two inserts may register with the centre to centre distance of the pole pieces of any single magnet.

What we claim as our invention is:

1. A magnetic clutch comprising a pair of rotors adapted for mounting on aligned shafts, one rotor having a pair of circular rows of magnets and the other rotor having two armature bands in opposition to the rows of magnets, each of said armature bands being metallic and having different characteristics as to electro conductivity and magnetic permeability, one of said armature bands being formed of two laminations of different metal and the other armature band being formed of two laminations, one of which is slotted radially.

2. A magnetic clutch as claimed in claim 1, wherein the radial slots of the second named armature band are filled with iron inserts.

3. A magnetic clutch comprising a pair of rotors adapted for mounting on aligned shafts, one rotor having a pair of circular rows of magnets and the other rotor having two armature bands in opposition to the rows of magnets, each of said armature bands being metallic and having different characteristics as to electro conductivity and magnetic permeability, one of said armature bands being formed of two laminations of different metal and the other armature band being formed of two laminations, one of which is slotted radially, the radial slots of the second named armature band being filled with iron inserts, the pole pieces of the magnets being arranged in tandem and the slots of the second named armature band being spaced to register with the pole pieces of the magnets opposing said slotted armature band.

4. A magnetic clutch as claimed in claim 1, wherein the slots of the lamination are alternately staggered radially.

References Cited in the file of this patent

UNITED STATES PATENTS

| | | |
|---|---|---|
| 995,731 | Stewart | June 20, 1911 |
| 1,748,753 | Bowie | Feb. 25, 1930 |
| 1,967,092 | Leibing | July 17, 1934 |
| 2,071,943 | Fraser | Feb. 23, 1937 |
| 2,119,819 | List | June 7, 1938 |
| 2,280,736 | Winther | Apr. 21, 1942 |
| 2,659,021 | Poliansky | Nov. 10, 1953 |

FOREIGN PATENTS

| | | |
|---|---|---|
| 410,589 | Great Britain | May 24, 1934 |
| 576,458 | Germany | May 11, 1933 |
| 771,976 | France | Aug. 6, 1934 |